United States Patent [19]
Hruby et al.

[11] Patent Number: 6,000,332
[45] Date of Patent: Dec. 14, 1999

[54] PROCESS FOR ACHIEVING A LENTICULAR EFFECT BY SCREEN PRINTING

[75] Inventors: Kenneth Christopher Hruby, Torrance, Calif.; Thomas Russell Gardner, Rockport, Mass.

[73] Assignee: Cyrk, Inc., Gloucester, Mass.

[21] Appl. No.: 08/939,806

[22] Filed: Sep. 30, 1997

[51] Int. Cl.$^6$ .............................. B41M 3/06; B41M 3/14
[52] U.S. Cl. ..................... 101/129; 101/128.21; 40/453
[58] Field of Search .................... 101/114, 115, 101/128.21, 128.4, 129; 40/453; 283/91

[56] References Cited

U.S. PATENT DOCUMENTS

| | | | |
|---|---|---|---|
| 3,852,564 | 12/1974 | Baum et al. | 101/127 |
| 4,033,059 | 7/1977 | Hutton et al. | 101/150 |
| 4,324,815 | 4/1982 | Mitani et al. | 101/129 |
| 4,363,289 | 12/1982 | Gasser | 101/128.4 |
| 4,857,111 | 8/1989 | Haubennestel et al. | 106/504 |
| 4,933,991 | 6/1990 | Love | 2/115 |
| 4,958,560 | 9/1990 | Collins | 101/128.21 |
| 4,971,644 | 11/1990 | Mahn, Sr. et al. | 156/253 |
| 5,035,929 | 7/1991 | Myers et al. | 428/30 |
| 5,093,160 | 3/1992 | Johnson et al. | 101/129 |
| 5,098,302 | 3/1992 | Sekiguchi | 434/426 |
| 5,100,330 | 3/1992 | Sekiguchi | 434/426 |
| 5,161,979 | 11/1992 | Sekiguchi | 434/365 |
| 5,197,886 | 3/1993 | Sekiguchi | 434/365 |
| 5,364,274 | 11/1994 | Sekiguchi | 434/365 |
| 5,390,595 | 2/1995 | Cutcher | 101/128.21 |
| 5,488,451 | 1/1996 | Goggins | 355/77 |
| 5,494,445 | 2/1996 | Sekiguchi et al. | 434/365 |
| 5,649,480 | 7/1997 | Yim | 101/129 |

FOREIGN PATENT DOCUMENTS

| | | | |
|---|---|---|---|
| 131408 | 10/1979 | Japan | 101/129 |
| 20796 | 1/1986 | Japan | 101/129 |

OTHER PUBLICATIONS

Autotype Americas, Inc. "Autosol 9000 Pre–Sensitized Photopolymer Garment Printing Emulsion" Product Description No Date.

The Chromaline Corporation "Pure Photopolymer Direct Emulsions" "Chroma/Tech® Direct Emulsions" A.S.M. Imaging Technology Form 140 Rev. B. No Date.

Ulano "QTX Technical Data" No Date.

Rutland Plastic Technologies, Inc. Product Technical Data Table of Contents pp. i–ii, and pp. 1–21 and back cover No Date.

*Primary Examiner*—Stephen R. Funk
*Attorney, Agent, or Firm*—Christie, Parker & Hale, LLP

[57] ABSTRACT

A method and materials for screen printing a substrate with raised designs. The raised designs allow for a lenticular effect through the printing of substantially parallel lines with varying heights in differing portions of the lines. The lenticular effects achieved include anticounterfeiting markings in bar codes and in the appearance of different colored images depending on the angle of view.

7 Claims, 5 Drawing Sheets

PROCESS FOR ACHIEVING A LENTICULAR EFFECT BY SCREEN PRINTING

FIELD OF THE INVENTION

The present invention relates to screen printing processes and materials. The present invention specifically relates to screen printing processes and materials for printing raised patterns exhibiting a lenticular effect on T-shirts and the like.

BACKGROUND OF THE INVENTION

Screen printing has long been used for the printing of images on T-shirts, apparel of all sorts, and cloth and synthetic fabrics generally. The use of screen printing processes have provided for the placement of artful and decorative images of a wide variety on wearing apparel.

A typical screen printing process comprises several steps. First a photoemulsion is applied to a screen. The screen is a cloth or synthetic fabric with a thread count of 80 to 300 threads per inch. A coat of photoemulsion is applied to the screen by covering one side of the screen with photoemulsion and then wiping away the excess with a squeegee. This process is generally repeated for the opposing side of the screen, with possibly two coats of photoemulsion applied to each side of the screen. The screen coated with photoemulsion forms a stencil for use in printing.

A decorative image is then formed on a sheet, or film, of an acetate/silver material. A black opaque image in the shape of the desired decorative image is formed on the film using methods known in the art. This film is then placed over the screen coated with the photoemulsion, and the screen is exposed to ultraviolet radiation. The portion of the screen corresponding to the design is shielded from the ultraviolet radiation because the black opaque image is impervious to ultraviolet radiation. The areas of photoemulsion exposed to the ultraviolet radiation, however, harden and become water insoluble. The photoemulsion on the screen not exposed to ultraviolet radiation is then washed away, leaving a screen with hardened photoemulsion coat forming the negative of the desired decoration.

The screen is then placed over the substrate to be printed, and ink is forced through the fine mesh of the screen and onto the substrate. This is done by covering the screen with ink and wiping a squeegee across the screen. The hardened photoemulsion prevents ink from passing through the screen except at the location of the decorative image. The amount of ink forced through the screen depends, in part, on the particular squeegee used and the method of use of the squeegee. A harder squeegee tends to deposit more ink on the substrate. Lowering the angle of the squeegee to the screen also tends to deposit more ink on the substrate, as does moving the squeegee across the screen at a slower rate. The shape of the squeegee blade also varies the amount of ink deposited on the substrate.

After the substrate is printed with the decorative design, the substrate is heated to dry the ink. Plastisol inks have been used so that fusion of the plastisol fuses the ink.

This process may be repeated multiple times for a single substrate. Repeating the process using different colored inks allows for a large variety of designs and images. The ease of the process allows for large numbers of prints to be easily made. The ease of the process, however, also allows designs prepared by one party to be easily copied by a multiplicity of other parties.

The above-described process also does not allow for well defined three dimensional images. A flat piece of cloth will exhibit a flat decorative image as the ink generally lies flat on the surface of the substrate. The decorative image therefore will be generally the same no matter at what angle the image is viewed. Furthermore, because the printed image is flat, the surface texture of the image will also generally be flat. Thus, the above-described process is greatly limited in not allowing the image to be enjoyed both visually in three dimensions and through the sense of touch.

SUMMARY OF THE INVENTION

The present invention provides a process and materials for screen printing raised patterns exhibiting a lenticular effect. In accordance with the present invention a first screen printing fabric is coated with a photoemulsion and a base image is produced on the first screen printing fabric by exposing selective areas of the photoemulsion to ultraviolet radiation. Ink is then forced through the screen printing fabric onto a substrate. A second layer of ink is then placed on the ink on the substrate. This is accomplished by coating a second screen printing fabric with a photoemulsion and producing a second image on the second screen printing fabric by exposing selective areas of the photoemulsion to ultraviolet radiation. The second image has areas designed to overlap parts of the first image.

One lenticular effect is achieved by including in the base image a plurality of parallel lines and having the second image include a similar set of a plurality of parallel lines with gaps in some of the lines. Forming a thicker stencil by applying multiple coats of photoemulsion to the screen printing fabrics allows for greater vertical depth of the ink printed on the substrate, as so also does using an ink comprised of a plastisol ink, a thickener, and a puffing additive.

The present invention thereby provides a process and materials for screen printing raised images on a substrate to allow for a lenticular effect. The attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

Figure 1:
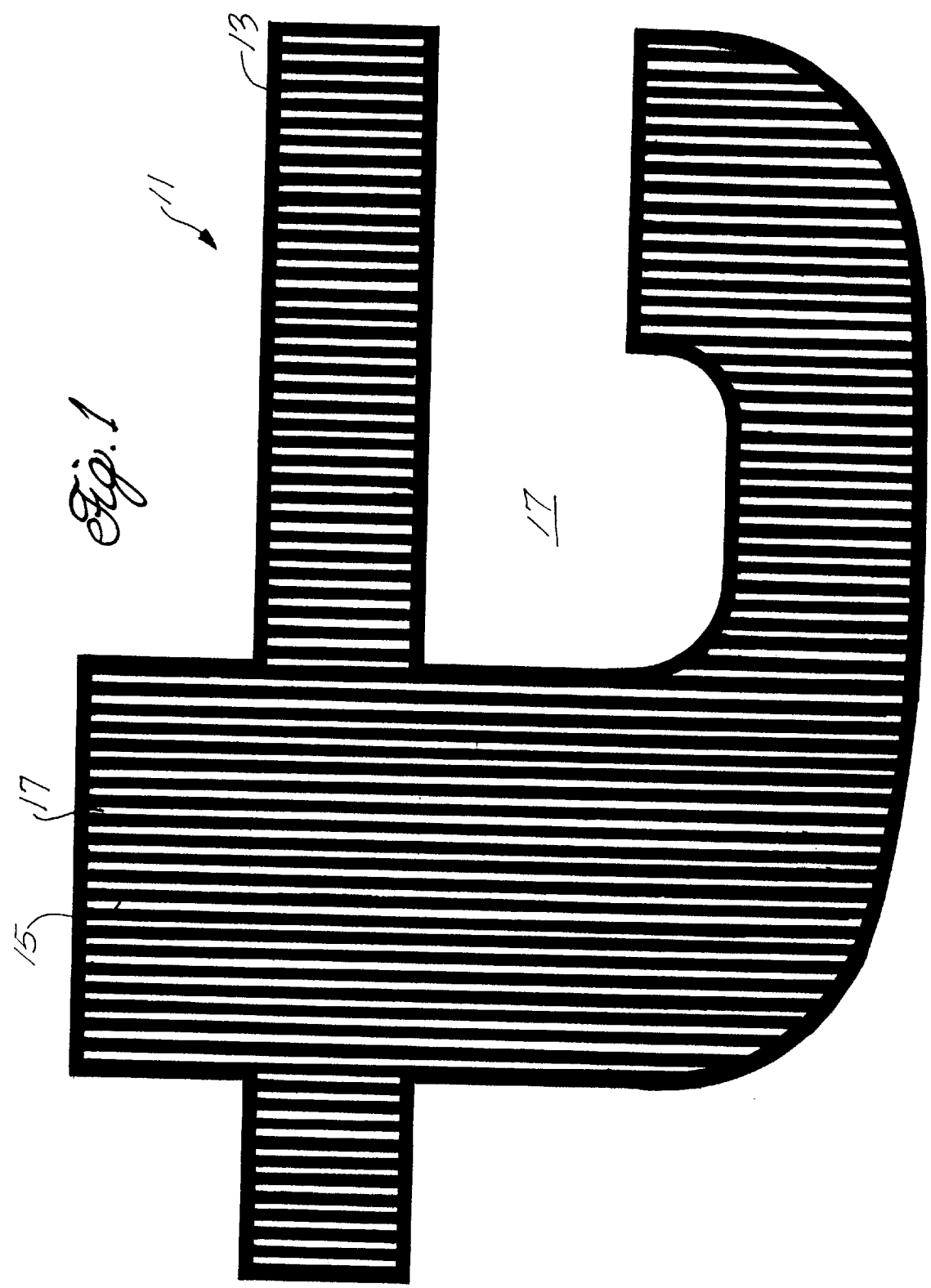
FIG. 1 is a front view of a decorative image formed using the present invention.
Figure 2:
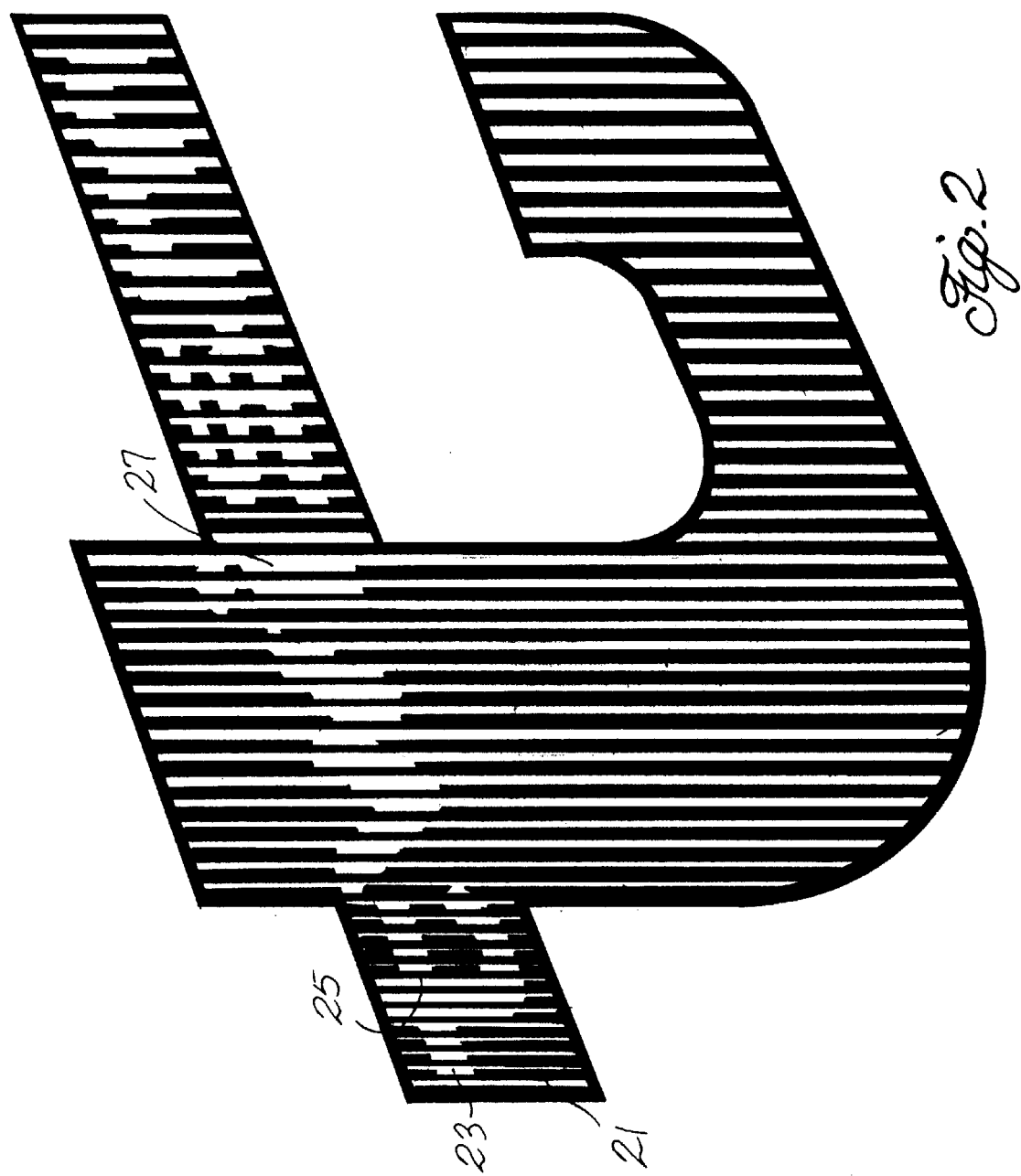
FIG. 2 is the decorative image of FIG. 1 seen at an angle.
Figure 6:
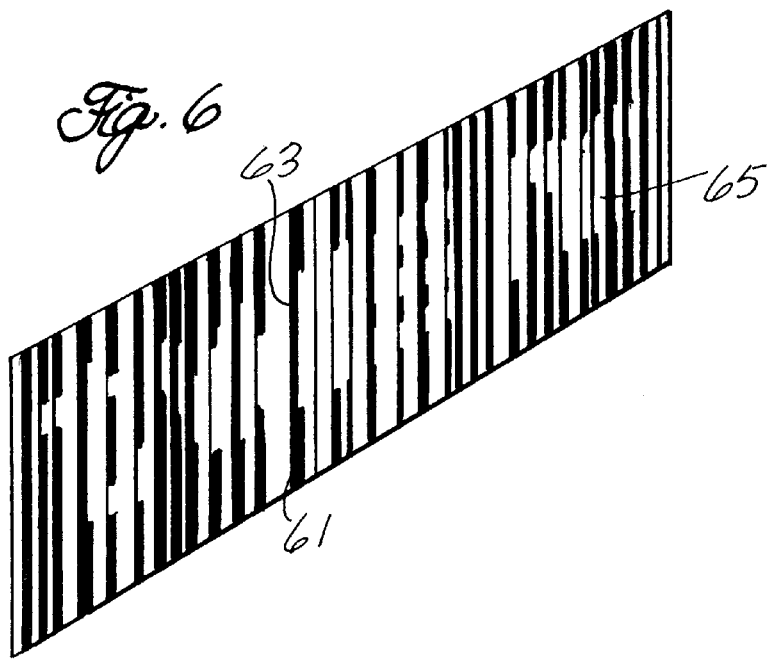
FIG. 6 is a side view of the bar code symbol of FIG. 5.

FIG. 1 illustrates a frontal view of a decorative design 11 printed on a substrate 17 using the methods and materials of the present invention. The substrate is a T-shirt or other item of cloth apparel. The decorative design consists of an outline of a small letter "t" 13 with vertical lines 15 regularly spaced within the outline of the "t." The vertical lines are not of a uniform height. Portions of the lines vary in the extent to which they project outwards from the substrate. As illustrated in FIG. 2 (and FIG. 6), some portions 21 (61 in FIG. 6) of the lines are of a first height, and some portions 25 (63 in FIG. 6) of the lines are at a second height. This difference in the height of the lines allows for varying images to be seen when the substrate is viewed at an angle. For example, when the substrate of FIG. 1 is viewed at an angle, as shown in FIG. 2, the word "TWISM" 23 appears. TWISM appears because the lines at a greater height do not allow a substantial portion of the underlying cloth 27 (65 in FIG. 6) material to be seen, while the lines at a lower height allow substantially greater portion of the underlying cloth to be seen. As the underlying cloth is of a different color than the regularly spaced lines, the lines at the lower height allow additional designs to be seen.

The decorative image of the T-shirt of FIG. 1 is prepared by first creating a stencil by coating a screen with a photoemulsion. The screen is a cloth with approximately 110 threads per square inch. Such cloth is widely available and sold in bolts. The screen is formed by cutting a suitable size portion of the bolt and attaching this portion to a frame.

To form the stencil, one end of the frame is placed in a trough and held at an angle. The trough contains photoemulsion. ULANO QTX from the Ulano Company of Brooklyn, N.Y., is one such photoemulsion. Coats of photoemulsion are applied to the screen by drawing up photoemulsion over the screen and substantially forcing the photoemulsion through the screen with a squeegee. The screen is then reversed so that what was the underside of the screen is now facing upward. The photoemulsion previously forced through the screen therefore is also facing upward. The process of drawing up photoemulsion over and through the screen is then repeated. As additional photoemulsion is placed onto the screen each time the photoemulsion is drawn up over the screen, the coating of photoemulsion increases in thickness as each coat is applied. The upward side of the stencil is relatively smooth due to the action of the squeegee being drawn, or wiped, across the screen. This process of applying photoemulsion is repeated approximately five times for each side of the screen. The coats of photoemulsion are applied in a wet-on-wet manner, i.e., the coats of photoemulsion are not dried prior to application of subsequent coats. By applying a multiplicity of coats of photoemulsion, a stencil with a thicker amount of photoemulsion is formed. Whereas stencil thickness is generally on the order of 1 mm, the multiplicity of coats allows the stencil thickness to be approximately 3 mm.

Figure 8:
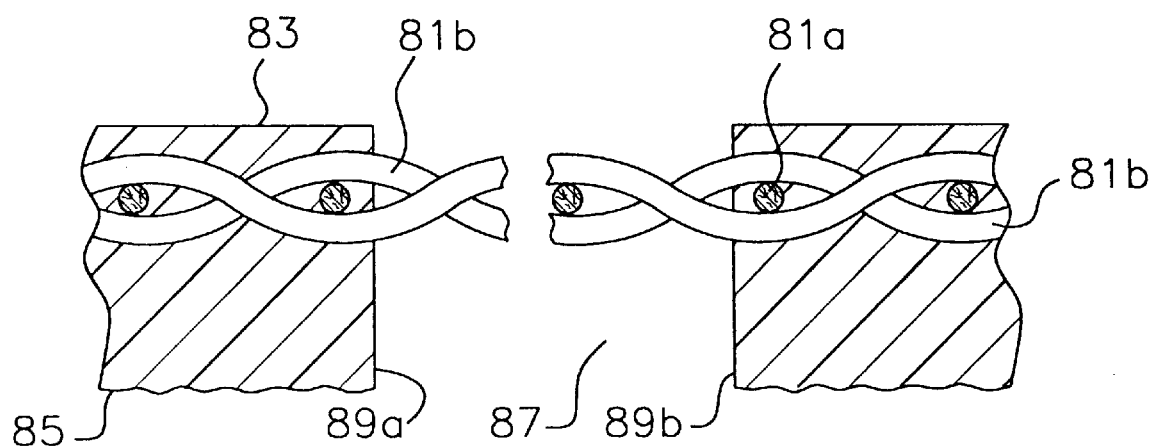
FIG. 8 is a partial cross-sectional view of a stencil used in forming the decorative image of FIG. 1.

FIG. 8 illustrates a partial cross-sectional view of a stencil so formed. In FIG. 8 the threads 81a, b of the screen are woven in a conventional manner. A first side 83, or top, of the stencil is relatively smooth. This is the side over which the squeegee depositing additional emulsion last passed. The photoemulsion on the top of the stencil does not extend significantly beyond the threads of the screen because the squeegee forces most of the photoemulsion through the threads. The second side 85, or underside, of the stencil is relatively rough and the photoemulsion extends significantly beyond the threads.

The screen is then removed from the trough of photoemulsion and allowed to dry. A film positive is taped or otherwise attached to the screen once the photoemulsion has dried. The film positive is an acetate/silver based film with a black opaque image on the film. The black opaque image is in the shape of the decorative image desired. In the case of the image of FIG. 1, the image is the outline of a "t" with regularly spaced substantially parallel vertical lines within the "t." Once the film positive is taped to the screen, the screen is exposed to ultraviolet light. The photoemulsion exposed to the ultraviolet light becomes water insoluble. The portion of the screen covered by the black opaque image, however, is not exposed to the ultraviolet light and therefore does not become water insoluble. Thus, after exposure to ultraviolet light, the photoemulsion from the portion of the screen comprising the design may be washed away with a gentle spray of cold water.

The partial cross-sectional view of FIG. 8 also illustrates a screen from which some photoemulsion has been washed away. A gap 87 formed by two edges 89a,b of hardened photoemulsion has been formed in the stencil by exposing the photoemulsion covering the screen to ultraviolet radiation, with the exception of the area indicated by the gap. Because the stencil is of greater thickness than normally utilized, ink forced through the gap is deposited in a more uniform manner having a sharper, more well defined vertical edge for the design being printed.

The process for preparing a screen is then repeated for a second screen. The black opaque image placed on the film used for the second screen is of a slightly different decorative image, however. This different decorative image is similar to that of the first decorative image, but a portion of the regularly spaced substantially vertical lines has been removed to form the word TWISM.

The screens are then loaded into a screen printing press. The screen printing press may be a manual press or an automatic press. Manual printing presses are available from suppliers such as the Hix Corporation. Automatic printing presses, such as the M&R Challenger, are available from the M&R Printing Equipment Company. The theory of operation of both manual and automatic screen printing presses is similar. The first screen is loaded into the press and centered onto a center line. The smooth side of the screen, namely the side of the screen over which photoemulsion was last wiped with the squeegee during creation of the stencil, is placed facing up. A substrate to be printed, such as a T-shirt, is placed on a platen or pallet underneath the screen, and the screen is loaded with ink. A squeegee is then wiped across the screen, forcing ink through the screen and onto the substrate. The second screen is then loaded onto the press, and the platen or pallet holding the shirt is moved under the second screen. The ink forced onto the substrate from the first screen does not need to be dried prior to application of the ink from the second screen when the ink is of the type described below. Once it is determined that the second screen is properly aligned with the image formed using the first screen, the second screen is locked into place. As may be appreciated, the second screen is used to place ink directly on top of much of the ink deposited using the first screen. The screen printing press is then ready to repeatedly produce T-shirts with the decorative image of FIG. 1. T-shirts are repeatedly placed on platens underneath each of the screens, and ink is deposited on the shirts.

Figure 3:
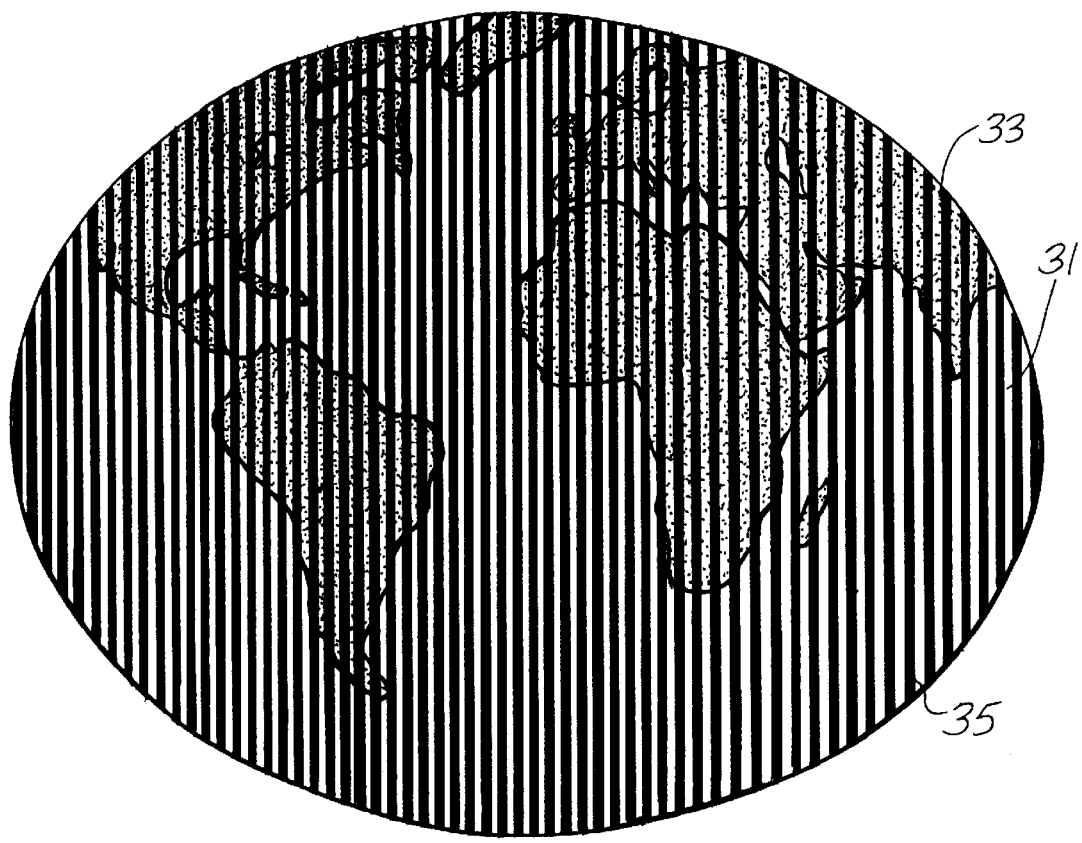
FIG. 3 is a front view of a second decorative image formed using the present invention.

The decorative image formed by the vertical lines may also be placed over other decorative images printed on the substrate using conventional techniques to create further lenticular effects. FIG. 3 illustrates vertical lines 35 printed using the present invention on top of a decorative image showing portions of the Earth. The decorative image of the Earth is printed using conventional methods and materials, with the land 33 a first color and the oceans 31 a second color. Because the vertical lines have height to them, they will block from view the underlying image when the design is viewed from either side. Thus, a globe would be seen when the design is viewed from the front while a colored ball would be seen when the design is viewed from either side.

The first lenticular effect described above can also be combined with the second lenticular effect described above. That is, vertical lines incorporating a "hidden" word or design can be placed over an underlying image. In such a case, the underlying image would be seen from the front whereas that image would be blocked and the "hidden" word or design seen from the side. Other three dimensional effects are also possible.

The ink used in printing the decorative image is a plastisol ink with additives. For the shirt of FIG. 1, a plastisol ink combined with both a thickener and a puff additive is used. The thickener is preferably a ground PVC powder, such as thickener No. 10 (Catalog No. M00010) from Rutland Plastic Technologies, Inc., of Pineville, N.C. The puff additive is also available from Rutland Plastic Technologies, Inc., as Catalog No. MP0005. First 5 percent by volume of puff additive is added to the plastisol ink. Then two to five percent by volume of thickener is added to the ink until the ink has a consistency similar to that found in commercial peanut butter.

Figure 4:
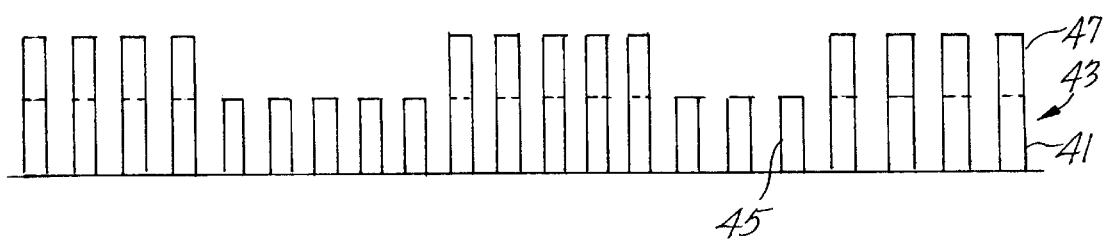
FIG. 4 is a cross-sectional view of a portion of the decorative image of FIG. 1.

The use of such an ink and a thicker than normal stencil allows for deposition of raised ink patterns on the substrate. As shown in FIG. 4, these raised ink patterns have well defined vertical edges. The bottom portions 41 of the taller vertical lines 43 are printed using the first screen. The shorter vertical lines 45 are also printed using the first screen. The top portions 47 of the taller vertical lines are printed using the second screen. The ink forming the top portions is deposited directly on the ink forming the bottom portions. The process, ink, and other aspects described above are useful in providing three dimensional textural images on substrates. Additionally, although the lenticular effect is described as being formed through the use of vertical lines, any number of a variety of repetitive patterns may be used to so form the three dimensional viewing effect. For example, a repetitive pattern of curving lines or raised dots may also be used to form the lenticular effect.

Figure 5:
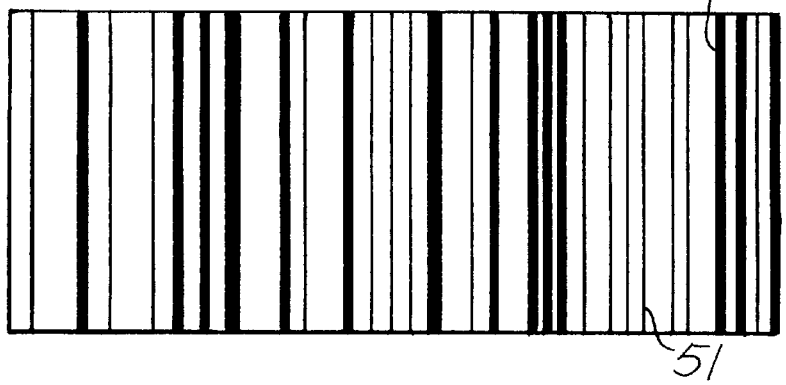
FIG. 5 is a front view of a bar code symbol formed using the present invention.

FIG. 5 shows a bar code printed on a substrate using the present invention. Bar codes are well known, and generally comprise a series of parallel vertical lines (51, 53) of variable width and spacing. When viewed in full frontal view, the bar code symbol of FIG. 5 appears as a standard bar code symbol and can be used as such. This same symbol, however, shows the word "TWISM" in substantially the same manner as the T-shirt of FIG. 1 when viewed at an angle. Thus, the present invention provides a way to incorporate distinct images within a bar code symbol as a mark of the authenticity and origin of the goods. Purchasers can verify the source of goods by viewing the bar code image at an angle.

Figure 7:
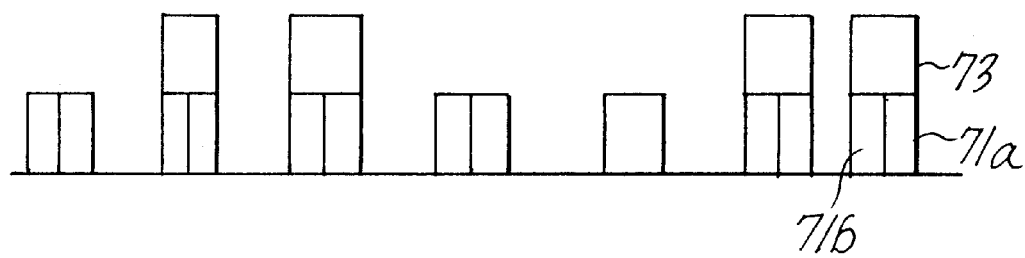
FIG. 7 is a cross-sectional view of another decorative image formed using the present invention.

FIG. 7 illustrates a cross-sectional view of another potential feature that can be provided by the present invention. The cross-sectional view of FIG. 7 is also a view of regularly spaced vertical lines printed using the present invention. The vertical lines have a bottom portion 71a, b, and the top portion 73. The ink forming the top portion is deposited directly on the ink forming the bottom portion. The bottom portion, however, is itself formed of two distinct parts. The bottom portion comprises two vertical lines printed adjacent one another. In the embodiment shown, the left side 71b of the bottom portion of the vertical line is printed a first color, for example, blue. The right side 71a of the bottom portion is printed in a second color, for example, red. Neither of these colors are visible when the design is viewed head on because the top portion of the lines obstructs from view the bottom portions of the lines. The bottom portions of the lines are visible, however, when the design is viewed from an angle. When the design is viewed from an angle that shows the left side of the bottom portions of the lines, the underlying image is blue. When the design is viewed from the right side, the underlying image is red. Indeed, by making the vertical lines a variety of heights and a variety of colors, a variety of designs can be created of different color and hue.

Thus, the processes and materials of the present invention allow for the printing on substrates using a screen printing process to provide a lenticular effect as well as sharp well defined raised edges of printed material on those substrates. Although this invention has been described in certain specific embodiments, many additional modifications and variations will be apparent to those skilled in the art. It is therefore to be understood that this invention may be practiced otherwise than is specifically described. Thus, the present embodiments of the invention should be considered in all respects as illustrative and not restrictive, the scope of the invention to be indicated by the following claims rather than the foregoing description.

We claim:

1. A process for achieving a lenticular effect comprising:

coating a first screen printing fabric with a photoemulsion by applying photoemulsion to a first side of the first screen printing fabric and wiping the first side of the first screen printing fabric a plurality of times, applying photoemulsion to a second side of the first screen Printing fabric and wiping the second side of the first screen printing fabric a plurality of times, and repeating the steps of applying photoemulsion to the first side of the first screen printing fabric and the second side of the first screen printing fabric at least three times;

producing a base image on the first screen printing fabric by exposing selective areas of the photoemulsion to radiation, the base image comprising a repetitive pattern;

forcing ink through the first screen printing fabric onto a substrate;

coating a second screen printing fabric with a photoemulsion by applying photoemulsion to a first side of the second screen printing fabric and wiping the first side of the second screen printing fabric a plurality of times, applying photoemulsion to a second side of the second screen printing fabric and wiping the second side of the second screen printing fabric a plurality of times, and repeating the steps of applying photoemulsion to the first side of the second screen printing fabric and the second side of the second screen printing fabric at least three times;

producing a second screen image on the second screen printing fabric by exposing selective areas of the photoemulsion to radiation, the second image having areas overlapping the first image wherein the second image comprises the repetitive pattern of the base image with gaps in the repetitive pattern; and forcing additional ink through the second screen printing fabric onto the link on the substrate.

2. The process of achieving a lenticular effect of claim 1 wherein the repetitive pattern comprises a plurality of parallel lines.

3. The process for achieving a lenticular effect of claim 2 wherein the second image comprises a plurality of parallel lines with gaps in some of the lines.

4. The process of achieving a lenticular effect of claim 3 wherein the additional ink forced through the second screen printing fabric is substantially superimposed on the ink on the substrate.

5. The process for achieving a lenticular effect of claim 4 wherein the ink comprises a plastisol ink, a thickener, and a puffing additive, and the additional ink comprises a plastisol ink, a thickener, and a puffing additive, with the thickener comprising up to about 5% of the ink by volume and the puffing additive comprising up to about 5% of the ink by volume.

6. The process for achieving a lenticular effect of claim 5 wherein the thickener comprises about 2% to about 5% of the ink by volume.

7. A process for achieving a lenticular effect comprising:
   coating a first screen printing fabric with a photoemulsion;
   producing a base image on the first screen printing fabric by exposing selective areas of the photoemulsion to radiation, the base image comprising a repetitive pattern;
   forcing ink through the first screen printing fabric onto a substrate;
   coating a second screen printing fabric with a photoemulsion;
   producing a second screen image on the second screen printing fabric by exposing selective areas of the photoemulsion to radiation, the second image having areas overlapping the base image;
   forcing additional ink through the second screen printing fabric onto the ink on the substrate;
   coating a third screen printing fabric with a photoemulsion;
   producing an additional base image on the third screen printing fabric by exposing selective areas of the photoemulsion to radiation, the additional base image comprising the repetitive pattern; and
   forcing ink through the third screen printing fabric onto the substrate, the ink forced through the third screen printing fabric being a different color than the ink forced through the first screen printing fabric; and
   wherein the ink forced through the second screen printing fabric substantially covers the ink forced through the first and third screen printing fabrics.

\* \* \* \* \*